(12) United States Patent
Komatsu et al.

(10) Patent No.: US 11,084,910 B2
(45) Date of Patent: Aug. 10, 2021

(54) CROSS-LINKED RUBBER AND PRODUCTION METHOD THEREFOR

(71) Applicants: ZEON CORPORATION, Chiyoda-ku Tokyo (JP); National Institute of Advanced Industrial Science and Technology, Chiyoda-ku Tokyo (JP)

(72) Inventors: Masaaki Komatsu, Tokyo (JP); Anna Komatsu, Tokyo (JP); Seisuke Ata, Tsukuba (JP); Kenji Hata, Tsukuba (JP); Shigeki Tomonoh, Tsukuba (JP)

(73) Assignee: ZEON CORPORATION, Tokyo (JP)

( * ) Notice: Subject to any disclaimer, the term of this patent is extended or adjusted under 35 U.S.C. 154(b) by 91 days.

(21) Appl. No.: 16/618,231

(22) PCT Filed: Jun. 6, 2018

(86) PCT No.: PCT/JP2018/021709
§ 371 (c)(1),
(2) Date: Nov. 29, 2019

(87) PCT Pub. No.: WO2018/225789
PCT Pub. Date: Dec. 13, 2018

(65) Prior Publication Data
US 2020/0115512 A1 Apr. 16, 2020

(30) Foreign Application Priority Data
Jun. 6, 2017 (JP) .............................. JP2017-112088

(51) Int. Cl.
*C08J 3/24* (2006.01)
*C08K 3/04* (2006.01)
*B29B 7/02* (2006.01)
*C08J 3/20* (2006.01)
*C08K 5/14* (2006.01)

(52) U.S. Cl.
CPC .... *C08J 3/24* (2013.01); *B29B 7/02* (2013.01); *C08J 3/20* (2013.01); *C08K 3/041* (2017.05); *C08K 5/14* (2013.01); *C08J 2315/02* (2013.01); *C08K 2201/003* (2013.01); *C08K 2201/004* (2013.01); *C08K 2201/006* (2013.01)

(58) Field of Classification Search
CPC ... C08J 3/24; C08J 3/20; C08J 2315/02; C08J 2327/12; C08K 3/041; C08K 5/14; C08K 2201/003; C08K 2201/004; C08K 2201/006; C08K 3/04; B29B 7/02; B29B 7/72; B29B 7/52; B29B 7/28; B29B 7/183; B29B 7/7495; C08L 27/20; C08L 27/16; C09K 3/10
See application file for complete search history.

(56) References Cited

U.S. PATENT DOCUMENTS

| | | | |
|---|---|---|---|
| 2008/0318049 A1 | 12/2008 | Hata et al. | |
| 2011/0263795 A1* | 10/2011 | Washino | ............... C08K 5/0025 525/326.3 |
| 2016/0032075 A1* | 2/2016 | Seibold | .................... F16L 11/04 138/137 |
| 2018/0362734 A1* | 12/2018 | Takeyama | ............... C08L 21/00 |
| 2019/0112465 A1 | 4/2019 | Takeyama | |

FOREIGN PATENT DOCUMENTS

| | | | |
|---|---|---|---|
| CN | 101296989 A | 10/2008 | |
| CN | 106633544 A | 5/2017 | |
| CN | 108884288 A | 11/2018 | |
| JP | 2014081073 A | 5/2014 | |
| JP | 2015168777 A | 9/2015 | |
| JP | 2016-108476 | * 6/2016 | |
| JP | 2016108476 A | 6/2016 | |
| JP | 2017186476 A | 10/2017 | |
| WO | 2006011655 A1 | 2/2006 | |
| WO | 2016208203 A1 | 12/2016 | |
| WO | WO-2016208203 A1 * | 12/2016 | ............. F16J 15/104 |
| WO | 2017175807 A1 | 10/2017 | |

OTHER PUBLICATIONS

Translation of JP 2016-108476 (Year: 2016).*
Sep. 11, 2018, International Search Report issued in the International Patent Application No. PCT/JP2018/021709.
Dec. 10, 2019, International Preliminary Report on Patentability issued in the International Patent Application No. PCT/JP2018/021709.

* cited by examiner

*Primary Examiner* — Robert C Boyle
(74) *Attorney, Agent, or Firm* — Kenja IP Law PC

(57) ABSTRACT

Provided is a cross-linked rubber that can improve long-term sealing properties of a seal member in high-temperature and high-pressure environments. The cross-linked rubber is obtained through cross-linking of a cross-linkable rubber composition containing a fluororubber, carbon black, one or more carbon nanotubes, and an organic peroxide cross-linker, and has a 50% modulus of 5 MPa or more, a compression set (230° C., 500 hours) of 80% or less, and a rate of change of elongation at break between before and after a heat aging test (230° C., 72 hours) of not less than −10% and not more than 10%.

13 Claims, No Drawings

CROSS-LINKED RUBBER AND PRODUCTION METHOD THEREFOR

TECHNICAL FIELD

The present disclosure relates to a cross-linked rubber and a cross-linked rubber production method, and, in particular, relates to a cross-linked fluororubber containing carbon nanotubes and a production method therefor.

BACKGROUND

A cross-linkable rubber composition that contains a fluorine-containing elastomer, carbon nanotubes, pulverized bituminous coal, and a peroxide cross-linker (organic peroxide cross-linker) is known as a material that can be used for formation of a seal member such as a packing or gasket (for example, refer to Patent Literature (PTL) 1 to 3).

In PTL 1 to 3, a cross-linkable rubber composition such as described above is produced using an open roll mill. Specifically, PTL 1 to 3 describe the production of a cross-linkable rubber composition by loading a fluorine-containing elastomer into an open roll mill and masticating the fluorine-containing elastomer so as to sever molecule chains of the fluorine-containing elastomer to an appropriate degree and generate free radicals to thereby place the fluorine-containing elastomer in a condition that facilitates binding to carbon nanotubes, subsequently adding carbon nanotubes and pulverized bituminous coal to the fluorine-containing elastomer that has been masticated and performing kneading and tight milling thereof using the open roll mill, and finally adding a peroxide cross-linker and performing kneading once again using the open roll mill.

PTL 1 to 3 also describe shaping and cross-linking a cross-linkable rubber composition produced as described above so as to obtain a seal member formed by a cross-linked rubber.

CITATION LIST

Patent Literature

PTL 1: JP 2016-108476 A
PTL 2: JP 2015-168777 A
PTL 3: JP 2014-81073 A

SUMMARY

Technical Problem

However, seal members formed using conventional cross-linkable rubber compositions such as described above have not been able to display adequate sealing properties over a long period in high-temperature (for example, 200° C. or higher) and high-pressure (for example, 70 MPa or higher) environments.

For this reason, there is demand for a cross-linked rubber that is capable of providing a seal member having excellent long-term sealing properties in high-temperature and high-pressure environments.

Solution to Problem

The present disclosure aims to advantageously solve the problem set forth above by disclosing a cross-linked rubber obtained through cross-linking of a cross-linkable rubber composition comprising a fluororubber, carbon black, one or more carbon nanotubes, and an organic peroxide cross-linker, wherein the cross-linked rubber has a 50% modulus of 5 MPa or more, a compression set under conditions of 230° C. and 500 hours of 80% or less, and a rate of change of elongation at break between before and after a heat aging test under conditions of 230° C. and 72 hours of not less than −10% and not more than 10%. A seal member having excellent long-term sealing properties in high-temperature and high-pressure environments (hereinafter, also referred to simply as "long-term sealing properties") can be obtained by using a cross-linked rubber that has the properties set forth above.

The "50% modulus" of a cross-linked rubber referred to in the present disclosure can be measured in accordance with JIS K6251.

Moreover, the "compression set under conditions of 230° C. and 500 hours" of a cross-linked rubber referred to in the present disclosure is the compression set after the cross-linked rubber is held with a compression rate of 25% for 500 hours at a temperature of 230° C., as measured in accordance with JIS K6262.

Furthermore, the "rate of change of elongation at break between before and after a heat aging test under conditions of 230° C. and 72 hours" of a cross-linked rubber referred to in the present disclosure is the rate of change (={($EB_1$−$EB_0$)/$EB_0$}×100%) of elongation at break after a heat aging test ($EB_1$: measured in accordance with JIS K6251) relative to elongation at break before the heat aging test ($EB_0$: measured in accordance with JIS K6251) in a case in which the heat aging test is implemented in accordance with JIS K6257 for 72 hours at a temperature of 230° C.

In the presently disclosed cross-linked rubber, the carbon black preferably includes coal having a carbon content of not less than 60 mass % and not more than 90 mass %. By using carbon black including coal that has a carbon content of not less than 60 mass % and not more than 90 mass %, heat resistance (heat aging resistance) of the cross-linked rubber can be increased. As a consequence, long-term sealing properties of a seal member can be further enhanced.

The "carbon content" of coal referred to in the present disclosure can be measured by the Liebig method in accordance with JIS M8813.

The presently disclosed cross-linked rubber preferably contains the coal in a proportion of not less than 0.5 parts by mass and less than 5 parts by mass per 100 parts by mass of the fluororubber. When the fractional content of coal having a carbon content of not less than 60 mass % and not more than 90 mass % is within the range set forth above, a balance of high levels of strength and heat resistance of the cross-linked rubber can be achieved. As a consequence, long-term sealing properties of a seal member can be further enhanced while ensuring strength of the seal member.

In the presently disclosed cross-linked rubber, the coal is preferably bituminous coal. By using carbon black that includes bituminous coal, heat resistance of the cross-linked rubber can be increased. As a consequence, long-term sealing properties of a seal member can be further enhanced.

The presently disclosed cross-linked rubber preferably has a breaking strength of 23 MPa or more. When the breaking strength of the cross-linked rubber is 23 MPa or more, adequate strength of the cross-linked rubber can be ensured, and long-term sealing properties of a seal member can be further enhanced.

The "breaking strength" of a cross-linked rubber referred to in the present disclosure can be measured in accordance with JIS K6251.

In the presently disclosed cross-linked rubber, the fluororubber preferably has a glass-transition temperature of −7° C. or lower. By using a fluororubber that has a glass-transition temperature of −7° C. or lower, a cross-linked rubber having excellent low-temperature characteristics is obtained. As a consequence, a seal member that displays good sealing characteristics even in low-temperature environments can be obtained.

The "glass-transition temperature" of a fluororubber referred to in the present disclosure can be measured by differential scanning calorimetry (DSC).

The presently disclosed cross-linked rubber preferably contains the carbon nanotubes in a proportion of not less than 0.4 parts by mass and less than 10 parts by mass per 100 parts by mass of the fluororubber. When the fractional content of carbon nanotubes is within the range set forth above, a balance of high levels of strength and heat resistance of the cross-linked rubber can be achieved. As a consequence, long-term sealing properties of a seal member can be further enhanced while ensuring strength of the seal member.

Moreover, the present disclosure aims to advantageously solve the problem set forth above by disclosing a cross-linked rubber production method for producing the cross-linked rubber set forth above, comprising: a step (A) of obtaining a composite containing a fluororubber and one or more carbon nanotubes that are dispersed in the fluororubber; a step (B) of kneading the composite, carbon black, and an organic peroxide cross-linker to obtain a cross-linkable rubber composition; and a step (C) of shaping and cross-linking the cross-linkable rubber composition to obtain a cross-linked rubber, wherein the composite is obtained in the step (A) by performing wet dispersing treatment of a mixture containing a fluororubber, one or more carbon nanotubes, and an organic solvent and subsequently removing the organic solvent. The use of wet dispersing treatment in production of the composite in step (A) in this manner enables good production of a cross-linked rubber having the physical properties set forth above.

In the presently disclosed cross-linked rubber production method, removal of the organic solvent in the step (A) is preferably performed by thin film drying. Removal of the organic solvent by thin film drying enables fast removal of the organic solvent with little heating. As a consequence, aggregation of carbon nanotubes during removal of the organic solvent can be inhibited, and a cross-linked rubber having a balance of high levels of strength and heat resistance can be obtained.

In the presently disclosed cross-linked rubber production method, it is preferable that the step (B) includes a step (B1) of kneading the composite and the carbon black to obtain a precompound and a step (B2) of kneading the precompound and the organic peroxide cross-linker to obtain the cross-linkable rubber composition, and kneading in the step (B2) is performed such that kneaded material does not reach a temperature of 90° C. or higher. By ensuring that kneaded material does not reach a temperature of 90° C. or higher during kneading of the precompound and the organic peroxide cross-linker, heat resistance of the cross-linked rubber can be further increased.

In the presently disclosed cross-linked rubber production method, the wet dispersing treatment of the mixture in the step (A) is preferably performed using a jet mill. The use of a jet mill yields a cross-linked rubber having a balance of high levels of strength and heat resistance.

In the presently disclosed cross-linked rubber production method, kneading in the step (B) is preferably performed using an internal kneader. The use of an internal kneader can further increase heat resistance of the cross-linked rubber.

In the presently disclosed cross-linked rubber production method, the internal kneader is preferably a pressing-type kneader. The use of a pressing-type kneader can further increase heat resistance of the cross-linked rubber.

Advantageous Effect

According to the present disclosure, a cross-linked rubber that is capable of providing a seal member having excellent long-term sealing properties in high-temperature and high-pressure environments is obtained.

DETAILED DESCRIPTION

The following provides a description that is divided into sections relating to a cross-linkable rubber composition that can be used in production of the presently disclosed cross-linked rubber; a production method for this cross-linkable rubber composition; the presently disclosed cross-linked rubber; and the presently disclosed cross-linked rubber production method.

(Cross-Linkable Rubber Composition)

A cross-linkable rubber composition that can be used in production of the presently disclosed cross-linked rubber contains a fluororubber, one or more carbon nanotubes, carbon black, and an organic peroxide cross-linker, and may optionally further contain additives such as a cross-linking aid and an acid acceptor.

However, note that the cross-linkable rubber composition is not limited to being used in production of the presently disclosed cross-linked rubber.

<Fluororubber>

Examples of the fluororubber include, but are not specifically limited to, vinylidene fluoride-based rubbers (FKM), tetrafluoroethylene-propylene-based rubbers (FEPM), and tetrafluoroethylene-perfluorovinyl ether-based rubbers (FFKM). Of these examples, a vinylidene fluoride-based rubber (FKM) is preferable as the fluororubber from a viewpoint of having excellent low-temperature characteristics. In particular, among FKMs, a type 3 FKM, type 4 FKM, or type 5 FKM (types defined by ASTM D1418) is preferable, and an FKM in which a perfluoro(alkyl vinyl ether) monomer is used as one monomer thereof (for example, a type 3 FKM or type 5 FKM) is particularly preferable from a viewpoint of having excellent low-temperature characteristics and amine resistance.

One of these fluororubbers may be used individually, or two or more of these fluororubbers may be used as a mixture.

The glass-transition temperature of the fluororubber is preferably −7° C. or lower, and more preferably −15° C. or lower. When the glass-transition temperature of the fluororubber is not higher than any of the upper limits set forth above, low-temperature characteristics of a cross-linked rubber obtained through cross-linking of the cross-linkable rubber composition can be improved. As a consequence, when the cross-linked rubber is used for a seal member, a seal member having excellent low-temperature characteristics can be obtained. The glass-transition temperature of the fluororubber is normally −40° C. or higher.

<Carbon Nanotubes>

Single-walled carbon nanotubes and/or multi-walled carbon nanotubes can be used as the carbon nanotubes (hereinafter, also abbreviated as "CNTs") without any specific limitations. However, the CNTs are preferably carbon nanotubes having from 1 to 5 walls, and are more preferably single-walled carbon nanotubes. The strength of a cross-linked rubber obtained through cross-linking of the cross-linkable rubber composition can be improved by using carbon nanotubes having a smaller number of walls. This results in higher safety in a situation in which the cross-linked rubber is used for a seal member.

Note that the cross-linkable rubber composition may further contain fibrous carbon nanostructures other than CNTs, such as carbon nanostructures in which a carbon six-membered ring network is formed in a non-circular tube shape (for example, a flattened tube shape).

The average diameter of the CNTs is preferably 1 nm or more, and is preferably 60 nm or less, more preferably 30 nm or less, even more preferably 10 nm or less, and particularly preferably 6 nm or less. Setting the average diameter of the CNTs within any of the ranges set forth above can improve the strength of a cross-linked rubber obtained through cross-linking of the cross-linkable rubber composition. This results in higher safety in a situation in which the cross-linked rubber is used for a seal member.

The "average diameter of CNTs" can be determined by measuring the diameters (external diameters) of 20 CNTs, for example, in a transmission electron microscope (TEM) image and then calculating a number-average value of the diameters.

The average length of the CNTs is preferably 1 μm or more, more preferably 50 μm or more, and even more preferably 80 μm or more, and is preferably 600 μm or less, more preferably 550 μm or less, and even more preferably 500 μm or less. Setting the average length of the CNTs within any of the ranges set forth above can improve the strength of a cross-linked rubber obtained through cross-linking of the cross-linkable rubber composition. This results in higher safety in a situation in which the cross-linked rubber is used for a seal member.

The "average length of CNTs" referred to in the present disclosure can be determined by measuring the lengths of 20 CNTs, for example, in a scanning electron microscope (SEM) image and then calculating a number-average value of the lengths.

The BET specific surface area of the CNTs is preferably 200 $m^2/g$ or more, more preferably 400 $m^2/g$ or more, and even more preferably 600 $m^2/g$ or more, and is preferably 2,000 $m^2/g$ or less, more preferably 1,800 $m^2/g$ or less, and even more preferably 1,500 $m^2/g$ or less. When the BET specific surface area of the CNTs is not less than any of the lower limits set forth above, the strength of a cross-linked rubber obtained through cross-linking of the cross-linkable rubber composition can be improved. This results in higher safety in a situation in which the cross-linked rubber is used for a seal member. Moreover, when the BET specific surface area of the CNTs is not more than any of the upper limits set forth above, this enables good dispersion of the CNTs in the cross-linkable rubber composition.

Note that the term "BET specific surface area" refers to nitrogen adsorption specific surface area that is measured by the BET method.

The carbon purity of the CNTs is preferably 70 mass % or more, more preferably 80 mass % or more, even more preferably 90 mass % or more, and particularly preferably 99 mass % or more. When the carbon purity of the CNTs is not less than any of the lower limits set forth above, the strength and heat aging resistance of a cross-linked rubber obtained through cross-linking of the cross-linkable rubber composition can be improved. This results in higher safety and enhanced long-term sealing properties in a situation in which the cross-linked rubber is used for a seal member.

The carbon purity can be determined through elemental analysis by X-ray fluorescence.

The CNTs can be produced by a known CNT synthesis method such as arc discharge, laser ablation, or chemical vapor deposition (CVD) without any specific limitations. Specifically, the CNTs can be efficiently produced, for example, by a method in which, during synthesis of CNTs through chemical vapor deposition (CVD) by supplying a feedstock compound and a carrier gas onto a substrate having a catalyst layer for carbon nanotube production at the surface thereof, a trace amount of an oxidizing agent (catalyst activating material) is provided in the system to dramatically improve catalytic activity of the catalyst layer (super growth method; refer to WO 2006/011655 A1). Hereinafter, carbon nanotubes that are obtained by the super growth method are also referred to as "SGCNTs".

The CNTs produced by the super growth method may be composed of just SGCNTs or may include non-circular tube-shaped carbon nanostructures or the like, for example, in addition to SGCNTs.

Although no specific limitations are placed on the amount of CNTs contained in the cross-linkable rubber composition, it is preferable that the amount of the CNTs is not less than 0.4 parts by mass and less than 10 parts by mass per 100 parts by mass of the fluororubber, for example. When the amount of the CNTs is not less than the lower limit set forth above, the strength of a cross-linked rubber obtained through cross-linking of the cross-linkable rubber composition can be improved. As a consequence, adequate seal member strength can be ensured in a situation in which the cross-linked rubber is used for a seal member. Moreover, when the amount of the CNTs is not more than the upper limit set forth above, the heat resistance of a cross-linked rubber obtained through cross-linking of the cross-linkable rubber composition can be improved. As a consequence, long-term sealing properties of a seal member can be sufficiently enhanced in a situation in which the cross-linked rubber is used for a seal member.

In particular, in a case in which the CNTs are single-walled carbon nanotubes (SWCNTs), the amount of the CNTs contained in the cross-linkable rubber composition per 100 parts by mass of the fluororubber is preferably not less than 0.5 parts by mass and not more than 5 parts by mass, more preferably not less than 0.5 parts by mass and not more than 3 parts by mass, even more preferably not less than 0.7 parts by mass and not more than 2 parts by mass, and particularly preferably not less than 0.9 parts by mass and not more than 2 parts by mass. On the other hand, in a case in which the CNTs are multi-walled carbon nanotubes (MWCNTs), the amount of the CNTs contained in the cross-linkable rubber composition per 100 parts by mass of the fluororubber is preferably not less than 1 part by mass and less than 10 parts by mass, and is preferably not less than 2 parts by mass and not more than 9 parts by mass.

Although it is not clear why it is possible to both improve heat resistance of a cross-linked rubber and improve long-term sealing properties of a seal member by setting the amount of CNTs as not more than a certain amount, the reasons for this are presumed to be that in a cross-linkable rubber composition that contains CNTs, cross-linking reaction is impeded by the CNTs, which makes it easier for thermal degradation to occur, and that elastic recovery is impeded due to formation of a network (three-dimensional reticulated structure) by the CNTs in a cross-linked rubber, which leads to poorer compression set.

However, note that the strength of a cross-linked rubber cannot be sufficiently improved in a case in which CNTs are not compounded therein.

<Carbon Black>

Examples of the carbon black include, but are not specifically limited to, furnace black, thermal black, Ketjenblack, and acetylene black. Moreover, the carbon black may be coal having a carbon content of not less than 60 mass % and not more than 90 mass %.

One of these types of carbon black may be used individually, or two or more of these types of carbon black may be used as a mixture. No specific limitations are placed on the particle diameter and structure of the carbon black.

In particular, from a viewpoint of improving heat resistance of a cross-linked rubber obtained through cross-linking of the cross-linkable rubber composition and also improving long-term sealing properties of a seal member for which the cross-linked rubber is used, it is preferable to use coal having a carbon content of not less than 60 mass % and not more than 90 mass % as the carbon black, more preferable to use a combination of coal having a carbon content of not less than 60 mass % and not more than 90 mass % and at least one selected from the group consisting of furnace black, thermal black, Ketjenblack, and acetylene black as the carbon black, and even more preferable to use a combination of coal having a carbon content of not less than 60 mass % and not more than 90 mass % and thermal black as the carbon black.

Although it is not clear why heat resistance of a cross-linked rubber can be improved and long-term sealing properties of a seal member for which the cross-linked rubber is used can be improved by using coal having a carbon content of not less than 60 mass % and not more than 90 mass %, the reason is presumed to be that radicals generated in the cross-linked rubber through decomposition reactions such as severing of cross-linking sites by heating do not continue to contribute to decomposition reactions until a termination reaction is reached, but instead react with impurities contained in the coal to form a new cross-linked structure and thereby inhibit deterioration of physical properties (for example, softening and elasticity reduction of the cross-linked rubber) caused by thermal degradation.

Moreover, although it is not clear why heat resistance of a cross-linked rubber can be improved and long-term sealing properties of a seal member for which the cross-linked rubber is used can be improved through combined use of thermal black, the reasons for this are presumed to be that thermal black tends not to influence heat aging resistance of the cross-linked rubber due to having high carbon purity and tends not to impede cross-linking, which leads to improvement of heat resistance, and also that thermal black has small cohesive force compared to other types of carbon black, and thus tends not to impede elastic recovery of the cross-linked rubber.

The coal having a carbon content of not less than 60 mass % and not more than 90 mass % may, for example, be bituminous coal, but is not specifically limited thereto. Moreover, the bituminous coal may, for example, be the commercially available product Austin Black, but is not specifically limited thereto.

The total amount of carbon black that is contained in the cross-linkable rubber composition can be adjusted as appropriate depending on the application of the cross-linked rubber. In particular, the total amount of carbon black contained in the cross-linkable rubber composition per 100 parts by mass of the fluororubber, for example, is preferably not less than 5 parts by mass and not more than 70 parts by mass, and more preferably not less than 45 parts by mass and not more than 60 parts by mass, but is not specifically limited thereto. When the total amount of carbon black is not less than any of the lower limits set forth above, a sufficient reinforcing effect is obtained, and formation of a network (three-dimensional reticulated structure) by the CNTs in a cross-linked rubber is sterically impeded, which can inhibit deterioration of compression set. As a consequence, long-term sealing properties of a seal member can be sufficiently enhanced. Moreover, when the total amount of carbon black is not more than any of the upper limits set forth above, poor dispersion of the carbon black can be avoided and excessive hardening of a cross-linked rubber can be prevented.

The amount of coal having a carbon content of not less than 60 mass % and not more than 90 mass % that is contained in the cross-linkable rubber composition per 100 parts by mass of the fluororubber, for example, is preferably not less than 0.5 parts by mass and less than 5 parts by mass, more preferably not less than 0.5 parts by mass and not more than 3 parts by mass, and even more preferably not less than 0.5 parts by mass and not more than 2 parts by mass, but is not specifically limited thereto. When the amount of coal having a carbon content of not less than 60 mass % and not more than 90 mass % is not less than any of the lower limits set forth above, deterioration of physical properties caused by thermal degradation can be sufficiently inhibited, and heat resistance of a cross-linked rubber obtained through cross-linking of the cross-linkable rubber composition can be improved. As a consequence, long-term sealing properties of a seal member can be sufficiently enhanced in a situation in which the cross-linked rubber is used for a seal member. Moreover, in consideration that coal having a carbon content of not less than 60 mass % and not more than 90 mass % has a weak reinforcing effect compared to other types of carbon black, strength of a cross-linked rubber, and particularly strength after a heat aging test can be improved when the amount of coal having a carbon content of not less than 60 mass % and not more than 90 mass % is not more than any of the upper limits set forth above. This can ensure adequate seal member strength in a situation in which the cross-linked rubber is used for a seal member.

<Organic Peroxide Cross-Linker>

The organic peroxide cross-linker is not specifically limited so long as it can cross-link the fluororubber. For example, organic peroxides such as 2,5-dimethylhexane-2,5-dihydroperoxide, 2,5-dimethyl-2,5-di(benzoylperoxy)hexane, t-butyl peroxide, dicumyl peroxide, t-butyl cumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexyne-3, 1,3-di(t-butylperoxyisopropyl)benzene, t-butyl peroxybenzoate, t-butylperoxy isopropyl carbonate, and n-butyl-4,4-di(t-butylperoxy)valerate can be used as the organic peroxide cross-linker. Moreover, commercially available products (for example, PERHEXA 25B and PERHEXA 25B-40 produced by NOF Corporation) can be used as these organic peroxide cross-linkers. Although a commercially available product that is diluted with a filler, such as PERHEXA 25B-40, is easier to use from a viewpoint of ease of handling, the use of a high-purity liquid peroxide cross-linker that is not diluted with a filler such as silicon oxide (for example, a commercially available product such as PERHEXA 25B) is preferable from a viewpoint of long-term physical properties such as heat aging resistance. The amount of the organic peroxide cross-linker can be adjusted as appropriate depending on the type of fluororubber and so forth.

Also note that one of these organic peroxide cross-linkers may be used individually, or two or more of these organic peroxide cross-linkers may be used as a mixture.

<Additives>

Additives that are typically used in the field of rubber compositions such as a cross-linking aid and an acid acceptor may be used without any specific limitations.

[Cross-Linking Aid]

The cross-linking aid is not specifically limited and may be a known cross-linking aid such as triallyl isocyanurate (TAIC), triallyl cyanurate, diallyl phthalate, trivinyl isocyanurate, tri(5-norbornene-2-methylene)cyanurate, 1,3-butylene glycol dimethacrylate, 1,4-butylene glycol dimethacrylate, ethylene glycol dimethacrylate, diethylene glycol dimethacrylate, triethylene glycol dimethacrylate, tetraethylene glycol dimethacrylate, trimethylolpropane triacrylate, trimethylolpropane trimethacrylate, triallyl formal, triallyl trimellitate, dipropargyl terephthalate, tetraallyl terephthalate amide, triallyl phosphate, fluorinated triallyl isocyanurate (1,3,5-tris(2,3,3-trifluoro-2-propenyl)-1,3,5-triazine-2,4,6-trione), triallyl phosphite, N,N-diallylacrylamide, hexaallyl phosphoramide, N,N,N',N'-tetraallyl tetraphthalamide, N,N,N',N'-tetraallyl malonamide, 2,4,6-trivinylmethyltrisiloxane, or triallyl phosphite. Of these examples, TAIC is preferable.

One of these cross-linking aids may be used individually, or two or more of these cross-linking aids may be used as a mixture.

[Acid Acceptor]

The acid acceptor is not specifically limited and may be a known acid acceptor such as magnesium oxide, lead oxide, zinc oxide, lead carbonate, zinc carbonate, or hydrotalcite. Of these examples, zinc oxide is preferable.

One of these acid acceptors may be used individually, or two or more of these acid acceptors may be used as a mixture.

The amount of additives such as described above can be adjusted as appropriate depending on the type of fluororubber, the type of organic peroxide cross-linker, and so forth.

(Production Method of Cross-Linkable Rubber Composition)

The cross-linkable rubber composition set forth above can be produced by mixing a fluororubber, one or more carbon nanotubes, carbon black, an organic peroxide cross-linker, and optional additives. Note that since the fluororubber, the carbon nanotubes, the carbon black, the organic peroxide cross-linker, and the additives may be the same as previously described, description thereof is omitted below.

Mixing of the ingredients described above may be performed by kneading and mixing all of the ingredients at once using a kneader or a roll, or by mixing the ingredients over multiple steps, without any specific limitations.

Of these methods, mixing of the ingredients over multiple steps is preferable from a viewpoint of uniformly mixing the ingredients. Moreover, from a viewpoint of obtaining a cross-linkable rubber composition in which there is good dispersion of CNTs, it is preferable that a composite containing CNTs dispersed in a fluororubber is produced, and subsequently the composite, carbon black, an organic peroxide cross-linker, optional additives, and so forth are kneaded to obtain a cross-linkable rubber composition. Furthermore, it is preferable that a precompound obtained by mixing ingredients other than an organic peroxide cross-linker (i.e., a fluororubber, carbon nanotubes, carbon black, and optional additives) is produced and then the precompound and an organic peroxide cross-linker are kneaded to obtain a cross-linkable rubber composition from a viewpoint of inhibiting progression of cross-linking during production of the cross-linkable rubber composition, and more preferable that a composite containing CNTs dispersed in a fluororubber is produced, the composite, carbon black, optional additives, and so forth are subsequently kneaded to produce a precompound, and finally the precompound and an organic peroxide cross-linker are kneaded to obtain a cross-linkable rubber composition from a viewpoint of achieving good dispersion of CNTs while also inhibiting progression of cross-linking.

<Production of Composite>

No specific limitations are placed on the method by which the composite containing CNTs dispersed in a fluororubber is obtained. For example, the composite may be produced by dry mixing a fluororubber and CNTs in the absence of a solvent using a kneader, a roll, a mixer, or the like, or the composite may be produced by performing wet dispersing treatment of a mixture containing a fluororubber, carbon nanotubes, and an organic solvent, and subsequently removing the organic solvent. Of these methods, it is preferable to produce the composite by performing wet dispersing treatment of a mixture containing a fluororubber, carbon nanotubes, and an organic solvent, and subsequently removing the organic solvent from a viewpoint of achieving good defibration of CNT bundle structures so as to increase dispersibility of the CNTs and a viewpoint of inhibiting depletion of radical capturing ability of the CNTs during production of the composite. Particularly in a case in which carbon black including coal having a carbon content of not less than 60 mass % and not more than 90 mass % is not used as the carbon black, it is preferable that the composite is produced by performing wet dispersing treatment of a mixture containing a fluororubber, carbon nanotubes, and an organic solvent, and subsequently removing the organic solvent. This is because although a cross-linkable rubber composition that does not contain coal having a carbon content of not less than 60 mass % and not more than 90 mass % does not benefit from the previously described inhibitive effect on thermal degradation through radicals generated in a cross-linked rubber reacting with impurities contained in the coal, a similar effect to this inhibitive effect on thermal degradation can be obtained through the radical capturing ability of CNTs by inhibiting depletion of the radical capturing ability of the CNTs during production of the composite.

Note that all fluororubber used in production of the cross-linkable rubber composition may be used in production of the composite, or just a portion of the fluororubber used in production of the cross-linkable rubber composition (for example, not less than 33 mass % and less than 100 mass % of all fluororubber) may be used in production of the composite. Moreover, in a case in which only a portion of the fluororubber is used in production of the composite, the remaining fluororubber may be kneaded with the composite at any timing, and is preferably kneaded with the composite before the remaining ingredients are kneaded with the composite.

[Organic Solvent]

The organic solvent may be any organic solvent in which the fluororubber can dissolve. Specifically, the organic solvent may, for example, be a ketone solvent such as methyl ethyl ketone (MEK) or methyl isobutyl ketone (MIBK), an ether solvent, or a mixture thereof, but is not specifically limited thereto. Of these examples, methyl ethyl ketone is preferably used as the organic solvent from a viewpoint of cost and handleability.

The phrase "in which the fluororubber can dissolve" as used in the present disclosure means that the solubility at a temperature of 40° C. is at least 10 g of fluororubber per 100 g of organic solvent.

[Mixture]

The mixture may be produced by adding CNTs to an organic solvent solution of a fluororubber, by mixing a CNT dispersion liquid containing CNTs dispersed in an organic solvent and an organic solvent solution of a fluororubber, or by adding a fluororubber to a CNT dispersion liquid containing CNTs dispersed in an organic solvent. Of these methods, it is preferable that the mixture is produced by adding CNTs to an organic solvent solution of a fluororubber.

A dispersant such as a surfactant may be compounded in the mixture with the aim of increasing CNT dispersibility. However, since a fluororubber can inhibit CNT aggregation in a case in which wet dispersing treatment is used, it is preferable that a dispersant is not compounded in the mixture from a viewpoint of inhibiting deterioration of physical properties of a cross-linked rubber obtained through cross-linking of the cross-linkable rubber composition.

From a viewpoint of CNT dispersibility and composite producibility, the concentration of fluororubber in the mixture is preferably 3 mass % or more, and more preferably 5 mass % or more, and is preferably 20 mass % or less, and more preferably 15 mass % or less, but is not specifically limited thereto.

Moreover, from a viewpoint of CNT dispersibility and composite producibility, the amount of CNTs in the mixture is preferably not less than 0.1 parts by mass and not more than 10 parts by mass per 100 parts by mass of organic solvent, but is not specifically limited thereto. Also note that in a case in which the CNTs are SWCNTs, the amount of CNTs in the mixture is more preferably not less than 0.1 parts by mass and not more than 0.5 parts by mass per 100 parts by mass of organic solvent, whereas in a case in which the CNTs are MWCNTs, the amount of CNTs in the mixture is more preferably not less than 1 part by mass and not more than 10 parts by mass per 100 parts by mass of organic solvent.

[Wet Dispersing Treatment]

The wet dispersing treatment can be performed, for example, using an ultrasonic disperser, a homogenizer, a thin-film spin system high-speed mixer, a bead mill, a wet jet mill, a twin screw kneader, or the like without any specific limitations. Moreover, the wet dispersing treatment may be performed using a method of twin screw kneading the mixture in the presence of supercritical carbon dioxide. Of these examples, the use of a thin-film spin system high-speed mixer, a bead mill, or a wet jet mill is preferable from a viewpoint of not imparting excessive shear force on the fluororubber, and the use of a wet jet mill is more preferable from a viewpoint of obtaining a cross-linkable rubber composition capable of providing a cross-linked rubber having excellent physical properties while also inhibiting CNT damage.

[Removal of Organic Solvent]

Removal of the organic solvent can be performed, for example, using any drying method such as hot-air drying, vacuum drying, spray drying, or thin film drying without any specific limitations. Of these methods, it is preferable that the organic solvent is removed by thin film drying from a viewpoint of quickly removing the organic solvent with little heating. Quick removal of the organic solvent can inhibit the reaggregation of carbon nanotubes that have been dispersed. As a consequence, it is possible to obtain a cross-linkable rubber composition capable of providing a cross-linked rubber having excellent strength. Moreover, removal of the organic solvent with little heating can inhibit thermal degradation of the fluororubber and makes it possible to obtain a cross-linkable rubber composition capable of providing a cross-linked rubber having excellent heat resistance.

[Composite]

The amount of CNTs contained in the composite produced as described above is preferably an amount such that the amount (M1) of CNTs per 100 parts by mass of fluororubber is not less than equal to and not more than 3 times the amount (M2) of CNTs contained in the cross-linkable rubber composition per 100 parts by mass of fluororubber. In other words, in a case in which the amount of CNTs contained in the cross-linkable rubber composition produced using the composite is 1 part by mass per 100 parts by mass of fluororubber, the amount of CNTs contained in the composite is preferably not less than 1 part by mass and not more than 3 parts by mass per 100 parts by mass of fluororubber in the composite. This is because the amount of fluororubber that is kneaded with the composite increases and good CNT dispersion in the cross-linkable rubber composition becomes difficult in a case in which M1 is more than 3 times M2.

A value for Mooney viscosity stress relaxation measurement, for example, can be evaluated as an indicator that M1 being not more than 3 times M2 is beneficial. More specifically, a judgment can be made by observing the attenuation condition of torque when a rotor is stopped after measurement of the Mooney viscosity (Mooney viscosity after preheating for 1 minute and a test time of 10 minutes at 100° C. and with a rotor speed of 2 rpm), and the Mooney viscosity 5 seconds after stopping rotation of the rotor is preferably 10 Mooney units or less.

<Production of Cross-Linkable Rubber Composition>

Kneading of the composite, carbon black, an organic peroxide cross-linker, and optional additives and remaining fluororubber is not specifically limited and may be performed using an open kneader such as an open roll mill, using an internal kneader such as a Banbury mixer or a pressing-type kneader, or using a combination of an internal kneader and an open kneader. Of these examples, the kneading of the composite, carbon black, an organic peroxide cross-linker, and optional additives and remaining fluororubber is preferably performed using an internal kneader, and is more preferably performed using a pressing-type kneader. Particularly in a case in which carbon black including coal having a carbon content of not less than 60 mass % and not more than 90 mass % is not used, it is particularly preferable to use an internal kneader, and even more preferable to use a pressing-type kneader such as an MS pressing-type kneader (for example, a WONDER KNEADER® (WONDER KNEADER is a registered trademark in Japan, other countries, or both) produced by Nihon Spindle Manufacturing Co., Ltd.). This is because although a cross-linkable rubber composition that does not contain coal having a carbon content of not less than 60 mass % and not more than 90 mass % does not benefit from the previously described inhibitive effect on thermal degradation due to reaction of radicals generated in a cross-linked rubber with impurities contained in coal, the use of an internal kneader, and particularly a pressing-type kneader such as a WONDER KNEADER can reduce shear heating during kneading and inhibit depletion of radical capturing ability of CNTs.

In a case in which the composite, carbon black, and optional additives and remaining fluororubber are kneaded to obtain a precompound, and then the precompound and an organic peroxide cross-linker are kneaded to obtain a cross-linkable rubber composition, it is preferable that an internal kneader is used in at least production of the precompound. This is because depletion of radical capturing ability of CNTs can be inhibited. Furthermore, in a case in which carbon black including coal having a carbon content of not less than 60 mass % and not more than 90 mass % is not used as the carbon black, it is preferable that an internal kneader, and particularly a pressing-type kneader such as a WONDER KNEADER, is used for both production of a precompound and kneading of the precompound and an organic peroxide cross-linker for the same reasons as described above.

In kneading of the precompound and the organic peroxide cross-linker to obtain a cross-linkable rubber composition, the kneading is preferably performed such that the kneaded material does not reach a temperature of 90° C. or higher. This is because depletion of radical capturing ability of CNTs can be inhibited, and heat resistance of a cross-linked rubber obtained through cross-linking of the cross-linkable rubber composition can be improved.

(Cross-Linked Rubber)

The presently disclosed cross-linked rubber is obtained through cross-linking of a cross-linkable rubber composition containing a fluororubber, carbon black, one or more carbon nanotubes, and an organic peroxide cross-linker, and has a 50% modulus of 5 MPa or more, a compression set (230° C., 500 hours) of 80% or less, and a rate of change of elongation at break between before and after a heat aging test (230° C., 72 hours) of not less than −10% and not more than 10%. The presently disclosed cross-linked rubber preferably has a breaking strength of 23 MPa or more.

As a result of the presently disclosed cross-linked rubber being obtained through cross-linking of a specific cross-linkable rubber composition and having specific physical properties, the presently disclosed cross-linked rubber can display excellent sealing properties over a long period when used as a seal member.

<Cross-Linkable Rubber Composition>

The previously described cross-linkable rubber composition can be used as the cross-linkable rubber composition.

<Cross-Linking>

Cross-linking of the cross-linkable rubber composition can be performed, for example, by a known cross-linking method such as through heating and pressing of the cross-linkable rubber composition inside a mold without any specific limitations. The cross-linking conditions can be set as appropriate depending on the type of fluororubber contained in the cross-linkable rubber composition and the application of the cross-linked rubber.

<50% Modulus>

The 50% modulus of the presently disclosed cross-linked rubber is required to be 5 MPa or more, and is preferably 7 MPa or more. A 50% modulus of 5 MPa or more enables the cross-linked rubber to display sufficiently high strength and sealing properties when used as a seal member. In particular, the cross-linked rubber can inhibit swelling destruction and has excellent high-pressure sealing properties when used as an O-ring.

<Compression Set>

The compression set (230° C., 500 hours) of the presently disclosed cross-linked rubber is required to be 80% or less, and is preferably 75% or less. According to research carried out by the inventors, the compression set of a CNT-containing cross-linked fluororubber after compression thereof at a high temperature (230° C.) for a long time (500 hours) is an indicator that encompasses the influence of each of poor cross-linking caused by CNTs impeding cross-linking reaction, ease of loss of cross-linking sites caused by thermal degradation, and inhibition of elastic recovery caused by formation of a three-dimensional reticulated structure by CNTs, and thus deterioration of sealing properties over time under the influence of these factors can be sufficiently prevented when the compression set (230° C., 500 hours) is 80% or less. Moreover, the compression set after compression at a high temperature (230° C.) for a long time (500 hours) is used because compression at a low temperature or for a short time of approximately 70 hours, for example, can only evaluate the influence of initial creep deformation of a cross-linked rubber and does not enable sufficient consideration of the influence of impedance of cross-linking reaction and the influence of ease of loss of cross-linking sites caused by thermal degradation. In particular, in the case of a fluororubber having high heat resistance, long-term sealing properties cannot be predicted based on the compression set for a short time of approximately 70 hours, or the change over time of compression set up until then. Furthermore, although a fluororubber displays decomposition type degradation behavior when observed over a long period, depending on the formulation, decomposition type and curing type competing reactions may be displayed during a comparatively early stage up until 70 hours, and thus it is necessary to evaluate compression set after a long time of at least 300 hours. This is also because when a compression set test is implemented in a state with poor cross-linking, there are cases in which despite compression set being comparatively good after approximately 200 hours, loss of cross-linking sites from the cross-linked rubber is accompanied by sudden deterioration from around 300 hours onwards.

<Rate of Change of Elongation at Break>

The rate of change of elongation at break of the presently disclosed cross-linked rubber between before and after a heat aging test (230° C., 72 hours) is required to be not less than −10% and not more than 10%. When the rate of change of elongation at break between before and after a heat aging test (230° C., 72 hours) is not less than −10% and not more than 10%, swelling destruction and the like can be sufficiently inhibited, and excellent sealing properties can be displayed over a long period.

<Breaking Strength>

The breaking strength of the presently disclosed cross-linked rubber is preferably 23 MPa or more, and more preferably 25 MPa or more. When the breaking strength is 23 MPa or more, sufficient strength of the cross-linked rubber can be ensured, swelling destruction and the like can be sufficiently inhibited, and long-term sealing properties of a seal member can be further enhanced.

The presently disclosed cross-linked rubber set forth above can be produced using the presently disclosed cross-linked rubber production method described below without any specific limitations. However, note that the presently disclosed cross-linked rubber may be produced by a method other than the presently disclosed cross-linked rubber production method.

(Cross-Linked Rubber Production Method)

The presently disclosed cross-linked rubber production method is a method for producing the cross-linked rubber set forth above and includes: a step (A) of obtaining a composite containing a fluororubber and one or more carbon nanotubes dispersed in the fluororubber; a step (B) of kneading the composite, carbon black, and an organic peroxide cross-linker to obtain a cross-linkable rubber composition; and a step (C) of shaping and cross-linking the cross-linkable rubber composition to obtain a cross-linked rubber. A feature of the presently disclosed cross-linked rubber production method is that the composite is obtained in step (A) by performing wet dispersing treatment of a mixture containing a fluororubber, one or more carbon nanotubes, and an organic solvent and subsequently removing the organic solvent.

In the presently disclosed cross-linked rubber production method, the use of wet dispersing treatment in step (A) inhibits reduction of radical capturing ability of CNTs during production of the cross-linked rubber. The presently disclosed cross-linked rubber production method can be particularly beneficially used in a case in which carbon black including coal having a carbon content of not less than 60 mass % and not more than 90 mass % is not used as the carbon black, but is not specifically limited to being used in this case.

Moreover, the presently disclosed cross-linked rubber production method enables good production of a cross-linked rubber having the previously described physical properties.

<Step (A)>
Step (A) can be implemented in accordance with matter described in the "Production of composite" section in the production method of the previously described cross-linkable rubber composition.

<Step (B)>
Although the composite, carbon black, and an organic peroxide cross-linker may be kneaded all at once in step (B), it is preferable that step (B) includes a step (B1) of kneading the composite and carbon black to obtain a precompound and a step (B2) of kneading the precompound and an organic peroxide cross-linker to obtain the cross-linkable rubber composition. Kneading in step (B2) is preferably performed such that the kneaded material does not reach a temperature of 90° C. or higher.

Step (B), step (B1), and step (B2) can be implemented in accordance with matter described in the "Production of cross-linkable rubber composition" section of the production method of the previously described cross-linkable rubber composition.

<Step (C)>
No specific limitations are placed on the method by which the cross-linkable rubber composition is shaped and cross-linked in step (C). For example, in step (C), the cross-linkable rubber composition may be shaped using a known shaping device such as a roll and the shaped product may subsequently be heated and cross-linked, or the cross-linkable rubber composition may be loaded into an extrusion molding machine, an injection molding machine, a calendering machine, or a mold and may be heated and pressed so as to simultaneously shape and cross-link the cross-linkable rubber composition.

Compression molding in which the cross-linkable rubber composition is loaded into a mold and is then heated and pressed is preferable from a viewpoint of imparting heat resistance through control of cross-linking. In particular, vacuum compression molding in which evolved gas can be actively discharged is particularly preferable. Moreover, it is preferable that secondary cross-linking is implemented at a higher temperature than primary cross-linking. With regards to the primary cross-linking conditions, it is preferable that the temperature and time are set from a cross-linking curve obtained using a cross-linking tester. However, the primary cross-linking time is preferably 15 minutes or more from a viewpoint of shape stability between samples in a situation in which numerous samples are produced.

Note that in a situation in which a sheet obtained using the cross-linkable rubber composition is punched to obtain a shaped product of a certain thickness, although multiple sheets may be stacked to attain any thickness, it is preferable that two or fewer sheets are stacked to obtain a shaped item of a certain thickness from a viewpoint of long-term sealing properties.

EXAMPLES

The following provides a more detailed description of the present disclosure through examples. However, the present disclosure is not limited to these examples.

In the examples and comparative examples, the following methods were used to measure and evaluate the glass-transition temperature of a fluororubber, the 50% modulus, compression set, rate of change of elongation at break, breaking strength, and elongation at break of a cross-linked rubber, and the long-term sealing properties and safety of a seal member for which a cross-linked rubber was used.

<Glass-Transition Temperature>
The glass-transition temperature was measured by DSC using a DSC7000 produced by Hitachi High-Tech Science Corporation.

Specifically, the glass-transition temperature was read from a DSC curve obtained by loading 20 mg of a fluororubber into an aluminum pan, heating the fluororubber to 50° C. at a heating rate of 10° C./min, subsequently rapidly cooling the fluororubber to −70° C. with liquid nitrogen, and then reheating the fluororubber at 10° C./min.

<50% Modulus>
The 50% modulus was measured by a method in accordance with JIS K6251.

Specifically, a no. 3 dumbbell shaped test specimen was obtained by punching out the test specimen from a sheet (thickness: 2.0±0.2 mm) of a cross-linked rubber using a Super Dumbbell Cutter for a no. 3 dumbbell shape (produced by Dumbbell Co., Ltd.).

A tensile tester (AGS-X produced by Shimadzu Corporation) that included a non-contact video extensometer (TRViewX500S produced by Shimadzu Corporation) was then used to perform a tensile test at a tensile rate of 500 mm/min in a constant-temperature and constant-humidity chamber having a temperature of 23° C. and a humidity of 50%. The initial distance between reference lines was 20 mm.

The tensile force when the test specimen was elongated by 50% was divided by the initial cross-sectional area of the test specimen to calculate the 50% modulus.

<Compression Set>
The compression set was measured by a method in accordance with JIS K6262. Note that a cylindrical small test specimen (diameter: 13.0±0.5 mm; height: 6.3±0.3 mm) prepared using a cross-linkable rubber composition was used as a test specimen. Moreover, the cross-linking conditions in preparation of the small test specimen were the same conditions as for the corresponding cross-linked rubber.

Specifically, a test was carried out using an air-circulation oven (Geer Type Oven produced by Toyo Seiki) that was heated to 230° C. and a compression set test mold produced by Dumbbell Co., Ltd. The small test specimen was set in the compression set test mold such that the compression rate was 25%, a spacer of 4.725 mm in thickness was subsequently set, and then the small test specimen was heated inside the air-circulation oven in a state with the test specimen compressed to a thickness of 4.725 mm.

The small test specimen was removed from the air-circulation oven at times 24 hours, 72 hours, 168 hours, 336 hours, and 504 hours after the start of heating. After allowing relaxation of strain, the small test specimen was left for 30 minutes in a constant-temperature and constant-humidity chamber having a temperature of 23° C. and a humidity of 50%. The compression set (%) for each time was calculated from the thickness of the test specimen after it had been left for 30 minutes.

A plot with time on a horizontal axis and the value for compression set on a vertical axis was made, and the value for compression set (%) at a heating time of 500 hours was read from the obtained curve.

<Rate of Change of Elongation at Break>

A heat aging test was implemented by a method in accordance with JIS K6257, the elongation at break was subsequently measured by a method in accordance with JIS K6251, and the rate of change of elongation at break was calculated.

Specifically, a no. 3 dumbbell shaped test specimen was obtained by punching out the test specimen from a sheet (thickness: 2.0±0.2 mm) of a cross-linked rubber using a Super Dumbbell Cutter for a no. 3 dumbbell shape (produced by Dumbbell Co., Ltd.).

Next, the no. 3 dumbbell shaped test specimen was attached to a test specimen attachment frame that rotated around a vertical axis of a forced circulation type heat aging tester (Geer Type Oven produced by Toyo Seiki) that was heated to 230° C. A heat aging test was implemented for 72 hours by causing the test specimen to rotate at 7 rotations per minute while causing forced circulation of air with an average speed of 0.5 m/s in a horizontal direction.

The no. 3 dumbbell shaped test specimen that had undergone the heat aging test was then subjected to a tensile test at a tensile rate of 500 mm/min using a tensile tester (AGS-X produced by Shimadzu Corporation) that included a non-contact video extensometer (TRViewX500S produced by Shimadzu Corporation), while under constant-temperature and constant-humidity conditions of 23° C. and 50% humidity. The initial distance between reference lines was 20 mm.

The elongation at the time of severing was taken to be the elongation at break after the heat aging test.

The elongation at break of a test specimen before the heat aging test was measured in the same way as for the test specimen after the heat aging test, and the rate of change of elongation at break was calculated.

<Breaking Strength and Elongation at Break>

The breaking strength and elongation at break were measured by a method in accordance with HS K6251.

Specifically, a no. 3 dumbbell shaped test specimen was obtained by punching out the test specimen from a sheet (thickness: 2.0±0.2 mm) of a cross-linked rubber using a Super Dumbbell Cutter for a no. 3 dumbbell shape (produced by Dumbbell Co., Ltd.).

A tensile tester (AGS-X produced by Shimadzu Corporation) that included a non-contact video extensometer (TRViewX500S produced by Shimadzu Corporation) was then used to perform a tensile test at a tensile rate of 500 mm/min in a constant-temperature and constant-humidity chamber having a temperature of 23° C. and a humidity of 50%. The initial distance between reference lines was 20 mm.

The tensile strength at the time of severing was taken to be the breaking strength and the elongation at the time of severing was taken to be the elongation at break.

<Long-Term Sealing Properties>

An AS568-223-type mold was used to produce an O-ring having a cross-sectional diameter of 3.53±0.1 mm and an internal diameter of 40.87±0.5 mm under cross-linking conditions shown in Table 1.

Next, the O-ring was set in a 200 MPa high-pressure specification pressure vessel produced by Rikenkiki Co., Ltd. such that the compression rate was within a range of 20% to 25%. The O-ring was heated for 500 hours at 230° C. using a band heater. Thereafter, a variable discharge pump (VFMP-15H) and a booster pump were used to increase the pressure inside the pressure vessel in increments of 10 MPa, and sealing properties were evaluated based on whether or not there was pressure reduction 10 minutes thereafter. Specifically, the same pressure was maintained for 5 minutes and then the booster circuit was closed after 5 minutes had passed. The O-ring was judged to have passed in a case in which pressure reduction from 5 to 10 minutes after the pressure increase was less than 10% (pressure reduction does not occur) and was judged to have failed in a case in which pressure reduction from 5 to 10 minutes after the pressure increase was 10% or more (pressure reduction occurs). Long-term sealing properties were evaluated by the following standard. A higher value for the pressure at which pressure reduction is observed indicates better long-term sealing properties.

A: Pressure reduction does not occur even at 110 MPa
B: Pressure reduction observed at not lower than 70 MPa and not higher than 100 MPa
C: Pressure reduction observed at 60 MPa or lower <Safety>

An AS568-223-type mold was used to produce an O-ring having a cross-sectional diameter of 3.53±0.1 mm and an internal diameter of 40.87±0.5 mm under cross-linking conditions shown in Table 1.

The produced O-ring was caused to decompose under heating for 3 hours in an electric furnace having of 450° C. nitrogen gas atmosphere. The sample was removed from the electric furnace, the shape thereof was inspected, and the shape was evaluated by the following standard. A case in which the shape is maintained indicates excellent safety.

A: Shape is maintained
B: Many cracks are present but shape is maintained
C: Broken into pieces and shape is not maintained Example 1

<Production of Composite>

A fluororubber solution having a concentration of 10 mass % was prepared by dissolving 1 kg of a three-component fluororubber (Viton GBL600S produced by the Chemours Company) in 9 kg of methyl ethyl ketone (MEK).

Next, 20.0 g of single-walled carbon nanotubes (ZEONANO SG101 produced by Zeon Nanotechnology Co., Ltd.; SGCNTs; average diameter: 4 nm; average length: 420 µm; BET specific surface area: 1,240 $m^2$/g; carbon purity: 99.91 mass %) were added to the fluororubber solution of 10 mass % in concentration and were stirred therewith for 3 hours at 3,000 rpm using a homogenizer to perform pre-dispersing treatment. A straight nozzle having nozzles of 170 µm in diameter and 180 µm in diameter connected was connected to a wet jet mill (NanoVater produced by Yoshida Kikai Co., Ltd.), the pre-dispersing treatment liquid was subjected to one pass therethrough at 30 MPa, and the absence of blocking was confirmed. Thereafter, the liquid was subjected to five passes at 100 MPa to carry out wet dispersing treatment.

When the average particle diameter was measured by a laser diffraction particle size distribution meter (LA-960 produced by Horiba, Ltd.), it was confirmed from the particle size distribution that the particle diameter was monodisperse displaying a unimodal distribution with an average particle diameter at 24 μm. Moreover, it was confirmed that CNTs having a particle diameter of 100 μm or more constituted 10 volume % or less.

A wet dispersing treatment liquid obtained in this manner was subsequently dried by thin film drying. Specifically, the wet dispersing treatment liquid was dripped in a location heated to approximately 130° C. so as to have a thickness of approximately 500 μm after drying, was dried until the solid concentration was 99 mass % or more, and was subsequently vacuum dried at 90° C. to obtain a composite containing single-walled carbon nanotubes in a proportion of 2 parts by mass per 100 parts by mass of fluororubber (step (A)).

<Production of Precompound>

A precompound was produced by kneading the composite, a three-component fluororubber (Viton GBL600S produced by the Chemours Company), carbon black, a cross-linking aid, and an acid acceptor using a Banbury mixer.

Specifically, the Banbury mixer was set to a temperature of 50° C., 50 parts by mass of a three-component fluororubber (Viton GBL600S produced by the Chemours Company) was masticated for 1 minute at 50 rpm, and then 51 parts by mass of the composite (amount of fluororubber: 50 parts by mass) was added and kneaded therewith for 1 minute. Thereafter, 29 parts by mass of medium thermal decomposition thermal black (Thermax N990 produced by Cancarb Limited) and 1 part by mass of Austin Black (produced by Coal Fillers, Inc.; bituminous coal having carbon content of 87 mass %) as carbon black, 3 parts by mass of TAIC (triallyl isocyanurate produced by Nippon Kasei Chemical Co., Ltd.) as a cross-linking aid, and 3 parts by mass of zinc oxide (produced by Hakusui Tech Co., Ltd.) as an acid acceptor were added, and a further 1 minute of kneading was performed. Next, 29 parts by mass of medium thermal decomposition thermal black (Thermax N990 produced by Cancarb Limited) and 1 part by mass of Austin Black (produced by Coal Fillers, Inc.; bituminous coal having carbon content of 87 mass %) were further added as carbon black, and a further 1 minute of kneading was performed to obtain a precompound in which ingredients other than an organic peroxide cross-linker had been mixed (step (B1)).

Note that if the torque did not stabilize during kneading, an additional 1 minute of kneading was performed. The temperature of the kneaded material was kept within a range of 150° C. to 175° C. Moreover, the loaded amount of material was adjusted such that the loading rate was 70% of the capacity.

<Production of Cross-Linkable Rubber Composition>

The obtained precompound was discharged from the Banbury mixer and 2 parts by mass of an organic peroxide cross-linker (PERHEXA 25B-40 produced by NOF Corporation; 40% silica-diluted product of 2,5-dimethyl-2,5-di(t-butylperoxy)hexane) was added to the precompound in a two-roll mill set to a temperature of 60° C. Note that the temperature of the precompound straight after discharge from the Banbury mixer as measured by inserting a thermocouple therein was 162° C.

After all of the organic peroxide cross-linker had been added, ¾ cutting back was performed back and forth three times. Note that the inter-roll gap was roughly 0.7 mm to 1.5 mm.

Finally, the inter-roll gap was set as 0.5 mm, and rounded passing was performed five times to obtain a cross-linkable rubber composition (step (B2)). The surface temperature (final temperature) of the cross-linkable rubber composition straight after the rounded passing was 84° C.

<Production of Cross-Linked Rubber>

Next, sheeting was performed in a two-roll mill to adjust the sheet thickness in accordance with the shape of a shaped item and thereby obtain a sheet of the cross-linkable rubber composition.

A 150 t compression molding machine was subsequently used to apply 100 ton of pressure to a mold made of steel that was 40 cm×40 cm in size, and primary cross-linking was performed for 7 minutes at a temperature of 177° C. In addition, secondary cross-linking was performed for 2 hours at a temperature of 232° C. to obtain a cross-linked rubber (step (C)).

Various physical properties were evaluated. The results are shown in Table 1.

Example 2

A composite, a precompound, a cross-linkable rubber composition, and a cross-linked rubber were produced in the same way as in Example 1 with the exception that, in production of the composite, the amount of single-walled carbon nanotubes was changed to 16.0 g such that a composite was produced that contained single-walled carbon nanotubes in a proportion of 1.6 parts by mass per 100 parts by mass of fluororubber, and, in production of the precompound, the amount of the composite was changed to 50.8 parts by mass (amount of fluororubber: 50 parts by mass) and the amount of Austin Black added in two portions was changed to 4 parts by mass in total (2 parts by mass×2).

Evaluations were conducted in the same manner as in Example 1. The results are shown in Table 1.

Example 3

<Production of Composite>

A composite containing single-walled carbon nanotubes in a proportion of 1.0 parts by mass per 100 parts by mass of fluororubber was produced in the same way as in Example 1 with the exception that the amount of single-walled carbon nanotubes was changed to 10.0 g (step (A)).

<Production of Precompound>

A precompound was produced by kneading the composite, a three-component fluororubber (Viton GBL600S produced by the Chemours Company), carbon black, a cross-linking aid, and an acid acceptor using a WONDER KNEADER. Note that a WONDER KNEADER has a structure with uniform clearance compared to a Banbury mixer and has high cooling ability, which can restrict shear heating during kneading to a low level.

Specifically, a WONDER KNEADER (WONDER KNEADER D0.5-3 produced by Nihon Spindle Manufacturing Co., Ltd.; kneader equipped with WONDER BLADE) heated to 80° C. was used to knead 50 parts by mass of a three-component fluororubber (Viton GBL600S produced by the Chemours Company) and 50.5 parts by mass of the composite (amount of fluororubber: 50 parts by mass) at 50 rpm. Thereafter, 35 parts by mass of medium thermal decomposition thermal black (Thermax N990 produced by Cancarb Limited) as carbon black and 3 parts by mass of zinc oxide (produced by Hakusui Tech Co., Ltd.) as an acid acceptor were added, and were kneaded therewith for 1 minute. Next, 35 parts by mass of medium thermal decomposition thermal black (Thermax N990 produced by Cancarb Limited) as carbon black and 3 parts by mass of TAIC (triallyl isocyanurate produced by Nippon Kasei Chemical Co., Ltd.) as a cross-linking aid were further added, and kneading was performed for 3 minutes to obtain a precompound in which ingredients other than an organic peroxide cross-linker had been mixed (step (B1)).

The final temperature of the kneaded material was 150° C. Moreover, the loaded amount of material was adjusted such that the loading rate was 85% of the capacity.

<Production of Cross-Linkable Rubber Composition>

The set temperature was subsequently lowered to 50° C. and the precompound was cooled at 10 rpm. Once the temperature had stabilized for 5 minutes, 2 parts by mass of an organic peroxide cross-linker (PERHEXA 25B-40 produced by NOF Corporation; 40% silica-diluted product of 2,5-dimethyl-2,5-di(t-butylperoxy)hexane) was added to the precompound by split addition over 3 minutes. A further 15 minutes of kneading was performed to obtain a cross-linkable rubber composition (step (B2)). The final temperature of the rubber was 83° C.

<Production of Cross-Linked Rubber>

In a two-roll mill that was heated to 40° C., ¾ cutting back of the crosslinkable rubber composition was performed back and forth at least three times, and then sheeting was performed to adjust the sheet thickness in accordance with the shape of a shaped item and thereby obtain a sheet of the cross-linkable rubber composition.

A 150 t compression molding machine was subsequently used to apply 100 ton of pressure to a mold made of steel that was 40 cm×40 cm in size, and primary cross-linking was performed for 30 minutes at a temperature of 160° C. Secondary cross-linking was then performed for two hours at a temperature of 232° C. to obtain a cross-linked rubber (step (C)).

Evaluations were conducted in the same manner as in Example 1. The results are shown in Table 1.

Example 4

In production of a composite, a two-component fluororubber (Dai-el G801 produced by Daikin Industries, Ltd.) was used instead of a three-component fluororubber and the amount of single-walled carbon nanotubes was changed to 40.0 g such that a composite was produced that contained single-walled carbon nanotubes in a proportion of 4.0 parts by mass per 100 parts by mass of fluororubber. A precompound was produced as described below. Moreover, 1.5 parts by mass of PERHEXA 25B (2,5-dimethyl-2,5-di(t-butylperoxy)hexane produced by NOF Corporation) was used as an organic peroxide cross-linker in production of a cross-linkable rubber composition. Note that since the organic peroxide cross-linker was a liquid, the liquid was added carefully as multiple portions by a dropper at a bank part in order that the liquid did not adhere to the rolls. Furthermore, in production of a cross-linked rubber, the primary cross-linking conditions were set as 20 minutes at a temperature of 160° C. and the secondary cross-linking conditions were set as 4 hours at a temperature of 180° C. With the exception of the above points, a composite, a precompound, a cross-linkable rubber composition, and a cross-linked rubber were produced in the same way as in Example 1.

Evaluations were conducted in the same manner as in Example 1. The results are shown in Table 1.

<Production of Precompound>

The precompound was produced by kneading the composite, a two-component fluororubber (Dai-el G801 produced by Daikin Industries, Ltd.), carbon black, and a cross-linking aid using a Banbury mixer.

Specifically, the Banbury mixer was set to a temperature of 50° C., 50 parts by mass of a two-component fluororubber (Dai-el G801 produced by Daikin Industries, Ltd.) was masticated for 1 minute at 50 rpm, and then 52 parts by mass of the composite (amount of fluororubber: 50 parts by mass) was added and was kneaded therewith for 1 minute. Thereafter, 25 parts by mass of medium thermal decomposition thermal black (Thermax N990 produced by Cancarb Limited) and 1 part by mass of Austin Black (produced by Coal Fillers, Inc.; bituminous coal having carbon content of 87 mass %) were added as carbon black, 4 parts by mass of TAIC (triallyl isocyanurate produced by Nippon Kasei Chemical Co., Ltd.) was added as a cross-linking aid, and 1 minute of kneading was performed. Next, 25 parts by mass of medium thermal decomposition thermal black (Thermax N990 produced by Cancarb Limited) and 1 part by mass of Austin Black (produced by Coal Fillers, Inc.; bituminous coal having carbon content of 87 mass %) were further added as carbon black, and 1 minute of kneading was performed to obtain a precompound in which ingredients other than an organic peroxide cross-linker had been mixed (step (B1)).

Note that if the torque did not stabilize during kneading, an additional 1 minute of kneading was performed. The temperature of the kneaded material was kept within a range of 150° C. to 175° C. Moreover, the loaded amount of material was adjusted such that the loading rate was 70% of the capacity.

Example 5

A composite, a precompound, a cross-linkable rubber composition, and a cross-linked rubber were produced in the same way as in Example 1 with the exception that, in production of the composite, 120.0 g of multi-walled carbon nanotubes (NC7000 produced by Nanocyl SA; average diameter: 9.5 nm; average length: 1.5 µm; BET specific surface area: 280 m$^2$/g; carbon purity: 90 mass %) were used instead of 20.0 g of single-walled carbon nanotubes such as to produce a composite containing multi-walled carbon nanotubes in a proportion of 12.0 parts by mass per 100 parts by mass of fluororubber, and, in production of the precompound, the amount of the composite was changed to 56.0 parts by mass (amount of fluororubber: 50 parts by mass) and the amount of medium thermal decomposition thermal black added as two portions was changed to 45 parts by mass in total (22.5 parts by mass×2).

Evaluations were conducted in the same manner as in Example 1. The results are shown in Table 1.

Example 6

A composite, a precompound, a cross-linkable rubber composition, and a cross-linked rubber were produced in the same way as in Example 5 with the exception that a three-component fluororubber "Viton GFLT600S" (produced by the Chemours Company) was used instead of the three-component fluororubber "Viton GBL600S" (produced by the Chemours Company) in production of the composite and in production of the precompound, the amount of multi-walled carbon nanotubes used in production of the composite was changed to 60.0 g such that a composite was produced that contained single-walled carbon nanotubes in a proportion of 6.0 parts by mass per 100 parts by mass of fluororubber, and, in production of the precompound, the amount of the composite was changed to 53.0 parts by mass (amount of fluororubber: 50 parts by mass) and the amount of Austin Black added as two portions was changed to 4 parts by mass in total (2 parts by mass×2).

Evaluations were conducted in the same manner as in Example 1. The results are shown in Table 1.

Comparative Example 1

A precompound, a cross-linkable rubber composition, and a cross-linked rubber were produced in the same way as in Example 1 with the exception that a composite was not produced and the precompound was produced as described below.

Evaluations were conducted in the same manner as in Example 1. The results are shown in Table 1.
<Production of Precompound>
A precompound was produced by kneading a three-component fluororubber (Viton GBL600S produced by the Chemours Company), carbon black, a cross-linking aid, and an acid acceptor using a Banbury mixer.

Specifically, the Banbury mixer was set to a temperature of 50° C. and 50 parts by mass of a three-component fluororubber (Viton GBL600S produced by the Chemours Company) was masticated for 1 minute at 50 rpm. Thereafter, 22.5 parts by mass of medium thermal decomposition thermal black (Thermax N990 produced by Cancarb Limited) as carbon black, 3 parts by mass of TAIC (triallyl isocyanurate produced by Nippon Kasei Chemical Co., Ltd.) as a cross-linking aid, and 3 parts by mass of zinc oxide (produced by Hakusui Tech Co., Ltd.) as an acid acceptor were added, and were kneaded therewith for 1 minute. Next, 22.5 parts by mass of medium thermal decomposition thermal black (Thermax N990 produced by Cancarb Limited) was further added as carbon black, and kneading was performed for 1 minute to obtain a precompound in which ingredients other than an organic peroxide cross-linker had been mixed (step (B1)).

Note that if the torque did not stabilize during kneading, an additional 1 minute of kneading was performed. The temperature of the kneaded material was kept within a range of 150° C. to 175° C. Moreover, the loaded amount of material was adjusted such that the loading rate was 70% of the capacity.

Comparative Examples 2 and 3

A precompound, a cross-linkable rubber composition, and a cross-linked rubber were produced in the same way as in Comparative Example 1 with the exception that the amount of medium thermal decomposition thermal black added as two portions in production of the precompound was changed to 60 parts by mass in total (30 parts by mass×2) or 70 parts by mass in total (35 parts by mass×2).

Evaluations were conducted in the same manner as in Example 1. The results are shown in Table 1.

Comparative Example 4

A cross-linkable rubber composition and a cross-linked rubber were produced in the same way as in Example 1 with the exception that the cross-linkable rubber composition was produced as described below without producing a composite and a precompound.

Evaluations were conducted in the same manner as in Example 1. The results are shown in Table 1.
<Production of Cross-Linkable Rubber Composition>
An open roll mill (roll temperature: 15° C.) having a roll diameter of 6 inches was loaded with 100 parts by mass of a three-component fluororubber (Viton GBL600S produced by the Chemours Company), and the three-component fluororubber was wrapped around a roll.

Next, 10 parts by mass of medium thermal decomposition thermal black (Thermax N990 produced by Cancarb Limited), 15 parts by mass of high-structure furnace black (SEAST FY produced by Tokai Carbon Co., Ltd.; arithmetic average particle diameter: 72 nm; DBP oil absorption: 152 cm$^3$/100 g), and 6 parts by mass of Austin Black (produced by Coal Fillers, Inc.; bituminous coal having carbon content of 87 mass %) as carbon black, 2 parts by mass of single-walled carbon nanotubes (SG101 produced by Zeon Nanotechnology Co., Ltd.; SGCNTs; average diameter: 4 nm; average length: 420 μm; BET specific surface area: 1,240 m$^2$/g; carbon purity: 99.91 mass %) as carbon nanotubes, 3 parts by mass of TAIC (triallyl isocyanurate produced by Nippon Kasei Chemical Co., Ltd.) as a cross-linking aid, and 3 parts by mass of zinc oxide (produced by Hakusui Tech Co., Ltd.) as an acid acceptor were added to the fluororubber. The inter-roll gap d was set as 1.5 mm during the above. Next, the inter-roll gap d was narrowed from 1.5 mm to 0.3 mm, and tight milling was performed five times to obtain a precompound. During the above, the surface speed ratio of the two rolls was 1.1.

The roll temperature setting was changed from 15° C. to 60° C., and 2 parts by mass of an organic peroxide cross-linker (PERHEXA 25B-40 produced by NOF Corporation; 40% silica diluted product of 2,5-dimethyl-2,5-di(t-butylperoxy)hexane) was added to the precompound. After all of the organic peroxide cross-linker had been added, ¾ cutting back was performed back and forth three times. Note that the inter-roll gap was set as roughly 0.7 mm to 1.5 mm.

Finally, the inter-roll gap was set as 0.5 mm, and rounded passing was performed five times to obtain a cross-linkable rubber composition.

TABLE 1

|  |  | Example 1 | Example 2 | Example 3 | Example 4 | Example 5 | Example 6 |
|---|---|---|---|---|---|---|---|
| Fluororubber | GBL600S [parts by mass] | 100 | 100 | 100 | — | 100 | — |
|  | Dai-el G801 [parts by mass] | — | — | — | 100 | — | — |
|  | GFLT600S [parts by mass] | — | — | — | — | — | 100 |
|  | Glass-transition temperature [° C.] | −18 | −18 | −18 | −21 | −18 | −26 |
| CNTs | Single-walled CNTs [parts by mass] | 1 | 0.8 | 0.5 | 2 | — | — |
|  | Multi-walled CNTs [parts by mass] | — | — | — | — | 6 | 3 |
| Carbon black | Thermal black [parts by mass] | 58 | 58 | 70 | 50 | 45 | 45 |
|  | Furnace black [parts by mass] | — | — | — | — | — | — |
|  | Austin Black [parts by mass] | 2 | 4 | — | 2 | 2 | 4 |

TABLE 1-continued

|  |  |  |  |  |  |  |  |
|---|---|---|---|---|---|---|---|
| Cross-linker | PERHEXA 25B [parts by mass] | — | — | — | 1.5 | — | — |
|  | PERHEXA 25B-40 [parts by mass] | 2 | 2 | 2 | — | 2 | 2 |
| Cross-linking aid | TAIC [parts by mass] | 3 | 3 | 3 | 4 | 3 | 3 |
| Acid acceptor | Zinc oxide [parts by mass] | 3 | 3 | 3 | — | 3 | 3 |
| Primary cross-linking | Temperature [° C.] | 177 | 177 | 177 | 160 | 177 | 177 |
|  | Time [min] | 7 | 7 | 7 | 20 | 7 | 7 |
| Secondary cross-linking | Temperature [° C.] | 232 | 232 | 232 | 180 | 232 | 232 |
|  | Time [hr] | 2 | 2 | 2 | 4 | 2 | 2 |
| 50% modulus [MPa] |  | 10 | 9 | 7 | 9 | 7 | 6 |
| Compression set [%] |  | 75 | 70 | 80 | 70 | 80 | 74 |
| Rate of change of elongation at break [%] |  | −8 | −9 | 1 | −8 | −7 | −10 |
| Breaking strength [MPa] |  | 25 | 23.5 | 23.5 | 29 | 24 | 24 |
| Elongation at break [%] |  | 150 | 140 | 170 | 220 | 170 | 130 |
| Long-term sealing properties |  | A | B | B | A | B | B |
| Safety |  | A | A | A | A | B | B |

|  |  |  | Comparative Example 1 | Comparative Example 2 | Comparative Example 3 | Comparative Example 4 |
|---|---|---|---|---|---|---|
| Fluororubber | GBL600S [parts by mass] |  | 100 | 100 | 100 | 100 |
|  | Dai-el G801 [parts by mass] |  | — | — | — | — |
|  | GFLT600S [parts by mass] |  | — | — | — | — |
|  | Glass-transition temperature [° C.] |  | −18 | −18 | −18 | −18 |
| CNTs | Single-walled CNTs [parts by mass] |  | — | — | — | 2 |
|  | Multi-walled CNTs [parts by mass] |  | — | — | — | — |
| Carbon black | Thermal black [parts by mass] |  | 45 | 60 | 70 | 10 |
|  | Furnace black [parts by mass] |  | — | — | — | 15 |
|  | Austin Black [parts by mass] |  | — | — | — | 6 |
| Cross-linker | PERHEXA 25B [parts by mass] |  | — | — | — | — |
|  | PERHEXA 25B-40 [parts by mass] |  | 2 | 2 | 2 | 2 |
| Cross-linking aid | TAIC [parts by mass] |  | 3 | 3 | 3 | 3 |
| Acid acceptor | Zinc oxide [parts by mass] |  | 3 | 3 | 3 | 3 |
| Primary cross-linking | Temperature [° C.] |  | 177 | 177 | 177 | 177 |
|  | Time [min] |  | 7 | 7 | 7 | 7 |
| Secondary cross-linking | Temperature [° C.] |  | 232 | 232 | 232 | 232 |
|  | Time [hr] |  | 2 | 2 | 2 | 2 |
| 50% modulus [MPa] |  |  | 3 | 4.5 | 4.8 | 4.9 |
| Compression set [%] |  |  | 81 | 80 | 78 | 115 |
| Rate of change of elongation at break [%] |  |  | 4 | 3 | 3 | −17 |
| Breaking strength [MPa] |  |  | 21 | 22 | 22 | 23 |
| Elongation at break [%] |  |  | 230 | 200 | 190 | 190 |
| Long-term sealing properties |  |  | C | C | C | C |
| Safety |  |  | C | C | C | A |

It can be seen from Table 1 that the cross-linked rubbers of Examples 1 to 6 each had excellent sealing properties when used as a seal member compared to the cross-linked rubbers of Comparative Examples 1 to 4.

It can also be seen from Table 1 that the cross-linked rubbers of Examples 1 to 4 in which single-walled carbon nanotubes were used each had excellent safety when used as a seal member compared to the cross-linked rubbers of Examples 5 and 6 in which multi-walled carbon nanotubes were used.

Note that when the glass-transition temperature of the cross-linked rubber in each example or comparative example was measured, it was confirmed that the increase from the glass-transition temperature of the fluororubber was 5° C. or less.

INDUSTRIAL APPLICABILITY

According to the present disclosure, a cross-linked rubber capable of providing a seal member having excellent long-term sealing properties in high-temperature and high-pressure environments is obtained.

The invention claimed is:

1. A cross-linked rubber obtained through cross-linking of a cross-linkable rubber composition comprising a fluororubber, carbon black, one or more carbon nanotubes, and an organic peroxide cross-linker, wherein the cross-linked rubber has:

a 50% modulus of 5 MPa or more;

a compression set under conditions of 230° C. and 500 hours of 80% or less; and a rate of change of elongation at break between before and after a heat aging test under conditions of 230° C. and 72 hours of not less than 10% and not more than 10%.

2. The cross-linked rubber according to claim 1, wherein the carbon black includes coal having a carbon content of not less than 60 mass % and not more than 90 mass %.

3. The cross-linked rubber according to claim 2, wherein the coal is contained in a proportion of not less than 0.5 parts by mass and less than 5 parts by mass per 100 parts by mass of the fluororubber.

4. The cross-linked rubber according to claim 2, wherein the coal is bituminous coal.

5. The cross-linked rubber according to claim 1, having a breaking strength of 23 MPa or more.

6. The cross-linked rubber according to claim 1, wherein the fluororubber has a glass-transition temperature of −7° C. or lower.

7. The cross-linked rubber according to claim 1, wherein the carbon nanotubes are contained in a proportion of not less than 0.4 parts by mass and less than 10 parts by mass per 100 parts by mass of the fluororubber.

8. A cross-linked rubber production method for producing the cross-linked rubber according to claim 1, comprising:

a step (A) of obtaining a composite containing a fluororubber and one or more carbon nanotubes that are dispersed in the fluororubber;

a step (B) of kneading the composite, carbon black, and an organic peroxide cross-linker to obtain a cross-linkable rubber composition; and a step (C) of shaping and cross-linking the cross-linkable rubber composition to obtain a cross-linked rubber, wherein the composite is obtained in the step (A) by performing wet dispersing treatment of a mixture containing a fluororubber, one or more carbon nanotubes, and an organic solvent and subsequently removing the organic solvent.

9. The cross-linked rubber production method according to claim 8, wherein removal of the organic solvent in the step (A) is performed by thin film drying.

10. The cross-linked rubber production method according to claim 8, wherein the step (B) includes a step (B1) of kneading the composite and the carbon black to obtain a precompound and a step (B2) of kneading the precompound and the organic peroxide cross-linker to obtain the cross-linkable rubber composition, and kneading in the step (B2) is performed such that kneaded material does not reach a temperature of 90° C. or higher.

11. The cross-linked rubber production method according to claim 8, wherein the wet dispersing treatment of the mixture in the step (A) is performed using a jet mill.

12. The cross-linked rubber production method according to claim 8, wherein kneading in the step (B) is performed using an internal kneader.

13. The cross-linked rubber production method according to claim 12, wherein the internal kneader is a pressing-type kneader.

* * * * *